United States Patent [19]

Führing et al.

[11] 4,135,310
[45] Jan. 23, 1979

[54] APPARATUS FOR THE TREATMENT OF WEBS OF MATERIAL

[75] Inventors: Heinrich Führing, Augsburg; Winfried Steitz, Friedberg, both of Germany

[73] Assignee: Böwe Böhler & Weber KG, Augsburg, Germany

[21] Appl. No.: 785,692

[22] Filed: Apr. 7, 1977

[30] Foreign Application Priority Data

Apr. 8, 1976 [DE] Fed. Rep. of Germany ....... 2615261

[51] Int. Cl.$^2$ .................... F26B 13/08; F26B 13/12; F26B 13/20
[52] U.S. Cl. .......................... 34/52; 34/115; 34/122; 34/156
[58] Field of Search ............... 34/115, 122, 156, 52

[56] References Cited

U.S. PATENT DOCUMENTS 3,346,247 10/1967 Talalay et al. ................. 34/156 X

FOREIGN PATENT DOCUMENTS 1604770 4/1974 Fed. Rep. of Germany ............ 34/115

Primary Examiner—Martin P. Schwadron
Assistant Examiner—Richard Gerard
Attorney, Agent, or Firm—Karl F. Ross

[57] ABSTRACT

An apparatus for the treatment of material in the form of webs, usually textile webs, with a heated treating fluid, e.g. hot air for the drying of the material, comprises a drum having a perforated periphery adapted to receive the web from a so-called float-dryer disposed above the drum. The treating fluid is forced through the perforations of the drum and contacts the web lying therealong. The float-dryer has a surface inclined downwardly toward the surface of the drum in a direction opposite the direction of rotation thereof and in a direction opposite the direction of rotation thereof and is provided with means forming a fluid cushion between the web and the float-dryer surface. The arrangement prevents the application of tensile stress to any significant extent to the web during the predrying and subsequent treatment thereof on the surface of the drum at the transition region between the predryer and the drum surface or elsewhere along the treating path.

18 Claims, 2 Drawing Figures

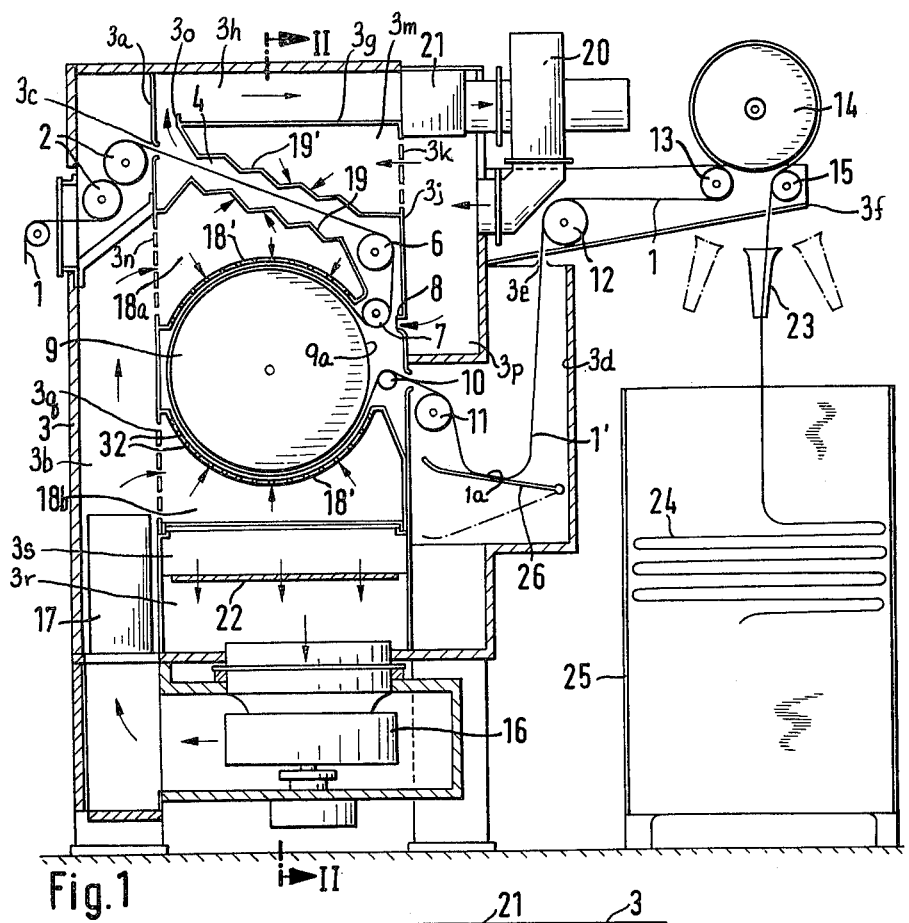
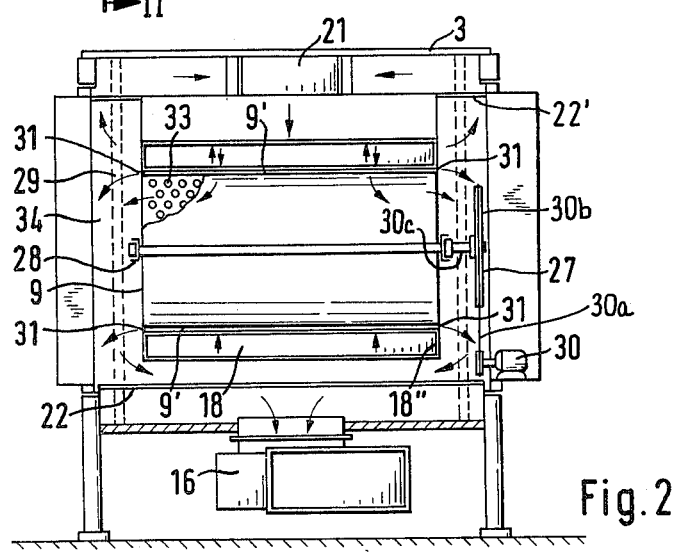

APPARATUS FOR THE TREATMENT OF WEBS OF MATERIAL

FIELD OF THE INVENTION

The invention relates to an apparatus for the treatment of webs of material, especially textile webs, with a heated treating medium usually a hot gas, using a perforated drum upon the cylindrical periphery of which the web is disposed and lies during the treatment.

BACKGROUND OF THE INVENTION

It is known to treat textile and other webs with a heated gaseous treating agent upon the cylindrical perforated periphery of a drum which is associated with a blower or the like to force the gaseous treating agent in substantially radial direction against the cylindrical surface of the drum. The treating medium traverses the ports or perforations of the cylindrical drum surface upon which the material lies in a fully supported and hence untensioned manner.

Such devices have been described, for example, in British patent No. 1,216,980 in which the apparatus is a so-called drum dryer. In this case, the treating agent, e.g. hot air, serves to dry the textile web.

German patent DT-PS No. 1,604,770 discloses a predrying path ahead of the drum dryer so that liquids which may be entrained with the textile webs do not come into contact with the perforated drum periphery. In other words, a major part of the adherent liquid is removed in the predrying stage so that only residual moisture must be eliminated on the periphery or surface of the drying drum. These conventional systems have the disadvantage that the transfer of the web to the surface of the drum and/or the transport of the web over the predrying path ahead of the drum is not tension-free and hence may result in distortion of the web. A tension-free drying of a textile web is desirable where the web is only loosely coherent and hence is subject to being torn apart by the transfer to the web or along a predrying path, especially since the weight of the exit web is often considerable.

OBJECTS OF THE INVENTION

It is the object of the invention to provide an apparatus for the substantially tension-free drying of a web of material, preferably a textile web whereby the disadvantages of the earlier systems can be obviated.

Another object of the invention is to provide an improved drum-type dryer for textile and other webs.

It is still another object of the invention to provide a compact apparatus of low capital cost for the tension-free drying of a textile web.

SUMMARY OF THE INVENTION

We have now found that all of these objects can be attained in a relatively simple and highly compact apparatus which combines the features or a drum-type dryer with those of a float dryer in which the material is supported upon a fluid cushion, i.e. a heated gas cushion, during its displacement along the path of the predryer and before it is transferred to the drying drum.

The apparatus of the present invention thus comprises, in a housing, a drying drum rotatable about a horizontal axis and having a perforated cylindrical periphery upon which the web is guided and supported during the final stages of the drying operation, blower means being provided in the housing to force the heated treating agent substantially radially through the ports or perforations of this drum and hence through the web of material underlying this periphery or surface of the drum. In addition, also within the aforementioned housing, there is provided a downwardly inclined float dryer which terminates immediately above the surface of the drum and which is inclined to the horizontal downwardly, preferably in a direction opposite the direction of rotation of the drum and approaching the surface of the latter to deposit the web of material thereon. The float dryer is provided with means for supporting the web of material above the inclined surface of this predryer upon a gas cushion.

Float dryers, i.e. dryers in which the textile web is floatingly supported during the drying by a gas cushion without contact with its surroundings and is displaced while so supported, are known, for example, from U.S. Pat. No. 2,682,116.

Using the system of the present invention, in which a float dryer is disposed above the drum and is oriented to have its gas cushion inclined to the horizontal downwardly, i.e. toward or approaching the drum, we have found it to be possible to effect the transfer of the material from the predryer to the drum surface substantially without tension to permit the movement of the web along the path defined by the predryer without tension. The only stresses applied to the web are those which arise from its own weight.

According to a feature of the invention, the gas is fed to the drying drum from the exterior, i.e. passes inwardly through the drum perforations. Thus the web is pressed by the treating gas against the periphery of the drum and is displaced thereby over the final portions of the path substantially without the application of tensile stress to the web.

The disposition of the predryer above the drying drum has been found to be especially advantageous in that it is highly compact and hence space-saving, without losing any significant portion of the effective length of the path defined by the circumference of the drum. Furthermore, since the drying of the web is effected substantially completely without the application of tensile stress to the web, the shrinkage of the latter can be readily controlled and maintained.

The desired shrinking of the textile web can be improved if, at the end of the float dryer path, there is disposed a reversing roller about which the web passes onto the drum, i.e. if the direction of the inclination, according to a preferred embodiment of the invention, is such that the float dryer path is inclined to the horizontal downwardly in the direction opposite that with which the drum is rotated. The reversing roller as well as the drum can be provided with a drive so that their peripheral speeds are somewhat less than the web speed at the beginning of the float-dryer path.

According to a particularly adantageous embodiment of the invention, the housing surrounds the drum defining a chamber into which the heating fluid is forced by one or more blowers, the chamber above the drum being partitioned by at least one inclined perforated surface which is formed with gas nozzles or orifices to generate the gas cushions along the path of the float-dryer.

BRIEF DESCRIPTION OF THE DRAWING

The above and other objects, features and advantages of the present invention will become more readily apparent from the following description, reference being made to the accompanying drawing in which:

FIG. 1 is a vertical cross-sectional view taken perpendicularly to the axis of the drum of an apparatus according to the present invention; and FIG. 2 is a section taken along the lines II-II of FIG. 1 but drawn to a smaller scale and somewhat distorted, omitting wall thickness where the same may be difficult to show in proportion.

SPECIFIC DESCRIPTION

As can be seen from FIG. 1, which shows all of the essential parts of the apparatus of the present invention, the textile web 1 is drawn by two driven feed rollers 2 into the machine, which has a housing 3, from a prior treating station not shown.

A partition 3a within the housing separates a gas plenum 18 from a feed duct 3b and is provided with a window 3c through which the web is guided into a float dryer 4 located above the drying drum 9 which is journaled in this housing.

At the end of the float dryer 4, there is provided a reversing roller 6 which can also be driven and is preferably operated at a speed slightly less than that of the feed speed of rollers 2. All speeds referred to herein are peripheral speeds.

The web then passes around a holder 7 designed to prevent folding of the edges of the web, along the surface 9a of the drum which is perforated. The web extends around the major portion of this cylindrical surface before passing over a roller 10 onto a support roller 11 ro form a loop 1a from which the web rises in an antechamber 2d through the discharge opening 3e to pass over a roller 12 and around a width holder 13, similar to that shown in 7, whereupon it extends about the periphery of another roller 14 of large diameter.

The web passes between the periphery of roller 14 and a roller 15 mounted, like members 12 and 13 upon a bracket 3f of the housing through a guide 23 which oscillates between the exteme positions shown in dot-dash lines to dispose the web in successive folds on a stack 24 on the stand 25.

The drive for the drum 9 and for the individual rollers described above and the drive of the guide 23, where illustrated, has been shown only schematically. In general, the drive may be effected via a motor 30 (FIG. 2) via a belt 30a and a pulley 30b carried between shaft 30c of the drum 9 whose bearings are represented diagrammatically at 28.

The float dryer 4 comprises an upper corrugated perforated plate 19' mounted at one end upon a horizontal partition 3g defining a duct 3h above the plenum 8 and upon the rear wall 3j of this plenum.

A register 3k admits air into the space 3m so that the heated air is delivered, as represented by the arrows, to the path traversed by the web through the floating dryer 4. A supporting cushion of air is provided from the perforated corrugated plate 19 which communicates with the upper air space 18a of the plenum and to which the air is fed through a register 3n in the wall 3a from the duct 3b.

The space 18a is bounded by an arc-segmental perforated wall 18' through which the hot air is admitted into contact with the web subtending the drum 9 in the radial direction as represented by the arrows, the air passing through the perforation in the drum surface 9a. Thus a gas cushion supports the web while it is dried in the unit 4 and a relaxation or crimping and shrinkage of this material in this predrying stage is permitted; the hot air from the path of the predryer 4 passes upwardly through an opening 3o into the duct 3h from which it is fed past the heating register or heat exchanger 21 into the blower 20 which feeds a chamber 3p delivering the air to the register 3k.

As noted previously, the feed rollers 2 are driven at a somewhat greater entry speed than the exit speed of the reversing roller 6 and the drum 9 downstream thereof so that the speed of the web at the end of the floating-drying path is reduced. The wall 3j is provided with further nozzles 8 which direct hot air from the chamber 3p against the web upon the width-maintaining roller 7.

The loop 1a operates a sensor 26 in chamber 3d which controls the speed of the motor driving the roller 14 so that the latter does not stretch the web in advancing the same to the stack 24. Hence the textile web is drawn from the drum 9 in a completely tension-free manner.

A further register 3q communicates between the duct 3b and the roll compartment 18b of the plenum which is provided with an arcuate wall 18' having perforations which admit the heating fluid to the material on the underside of the drum. Between the walls 18' and the periphery 9a of the drum, narrow arcuate slits 31 (FIG. 2) are formed through which the web passes along the periphery of the drum, the latter being bounded by walls 18" whose openings permit escape of air into ducts 27 and 34 flanking the drum.

The heating fluid is circulated by means of two blowers, namely, the axial-intake tangential outflow blower 16 disposed in the housing below the drum and the blower 20 previously described. The outflow from blower 16 is fed into the duct 3b through the heating unit 17 as represented by arrows. A partition 22 forms a duct 3r in the housing which communicates with the ducts 27 and 34 and opens into the intake of the blower 16. The perforation of the walls 18' may be simple orifices or can be nozzles oriented to train the hot air stream radially upon the textile web. The partition 22 can be perforated so as to be traversed by air from a compartment 3s thereabove.

Upright frames 29 are provided in the apparatus to form the bearings for the several rollers. The wheel 30b can, in accordance with an embodiment of the invention, be a sprocket, in which case member 30a may be a chain driven by the motor. The heating units 17 and 21 may be provided at their upstream side with condensers, not shown, to remove moisture from the air. Finally, it will be understood that, while the unit described can be used most effectively for the drying of textile webs, it is also applicable for the treatment thereof by other fluids than hot air.

We claim:

1. An apparatus for the treatment of a web of material with a fluid, comprises:
   a housing;
   a drum having a cylindrically perforated periphery rotatable in said housing about a horizontal axis;
   fluid-cushion means defining a substantially linear guide path for said web disposed above said drum in said housing and inclined toward said drum in a direction of advance of said web thereto, said fluid-cushion means including a pair of spaced-apart perforated wall defining between them a channel having an inlet at an upper location at one side of said drum, a linear stretch above said drum constituting said guide path, and an outlet at a lower location at the opposite side of said drum;

guide means between said outlet and said opposite side of said drum for depositing said web from said fluid-cushion means upon said periphery of said drum; and means in said housing for feeding a treating fluid to said fluid-cushion means for supporting said web along said path on a cushion of said fluid and for feeding said fluid generally radially through said web on said periphery of said drum.

2. The apparatus defined in claim 1, further comprising at least one chamber formed with an arcuate perforated wall spaced from and juxtaposed with the periphery of said drum, said means for feeding including a blower communicating with said chamber.

3. The apparatus defined in claim 2 wherein said fluid-cushion means includes a further perforated wall disposed above said drum and forming a wall of said chamber, said further perforated wall sustaining said fluid cushion thereabove.

4. The apparatus defined in claim 3, further comprising another perforated wall spacingly juxtaposed with said further perforated wall nd defining said path therewith, said further perforated wall forming a wall of another chamber communicating with a blower.

5. The apparatus defined in claim 4 wherein said drum is axially open and said housing is provided with duct means communicating with an axially open end of said drum for feeding fluid to at least one of said blowers.

6. The apparatus defined in claim 5, further comprising a heater along said duct means.

7. The apparatus defined in claim 6, further comprising roller means for supporting said web and removing same from the periphery of said drum.

8. The apparatus defined in claim 7 wherein said roller means includes at least one roller responsive to a loop of said web upon its removal from the periphery of said drum.

9. The apparatus defined in claim 8, further comprising feed rolls at the upstream end of said path for feeding said web thereto.

10. An apparatus for the treatment of a web of material with a fluid, comprises:

a housing;

a drum having a cylindrically perforated periphery rotatable in said housing about a horizontal axis;

fluid-cushion means defining a substantially linear guide path for said web disposed above said drum in said housing and inclined toward said drum in a direction of advance of said web thereto, said web being displaced from said fluid-cushion means upon said periphery of said drum;

means in said housing for feeding a treating fluid to said fluid-cushion means for supporting said web along said path on a cushion of said fluid and for feeding said fluid generally radially through said web on said periphery of said drum; and a reversing roller disposed at the downstream end of said path and guiding said web from said path onto said drum, said reversing roller being operated at a peripheral speed less than the speed of said web at the upstream end of said path.

11. The apparatus defined in claim 10, further comprising at least one chamber formed with an arcuate perforated wall spaced from and juxtaposed with the periphery of said drum, said means for feeding including a blower communicating with said chamber.

12. The apparatus defined in claim 11 wherein said fluid-cushion means includes a further perforated wall disposed above said drum and forming a wall of said chamber, said further perforated wall sustaining said fluid cushion thereabove.

13. The apparatus defined in claim 12, further comprising another perforated wall spacingly juxtaposed with said further perforated wall and defining said path therewith, said further perforated wall forming a wall of another chamber communicating with a blower.

14. The apparatus defined in claim 13 wherein said drum is axially open and said housing is provided with duct means communicating with an axially open end of said drum for feeding fluid to at least one of said blowers.

15. The apparatus defined in claim 14, further comprising a heater along said duct means.

16. The apparatus defined in claim 15, further comprising roller means for supporting said web and removing same from the periphery of said drum.

17. The apparatus defined in claim 16 wherein said roller means includes at least one roller responsive to a loop of said web upon its removal from the periphery of said drum.

18. The apparatus defined in claim 17, further comprising feed rolls at the upstream end of said path for feeding said web thereto.

* * * * *